No. 796,342. PATENTED AUG. 1, 1905.
O. MILLER & P. KUNZINGER.
TIP FOR FISHING RODS OR POLES.
APPLICATION FILED MAR. 22, 1905.
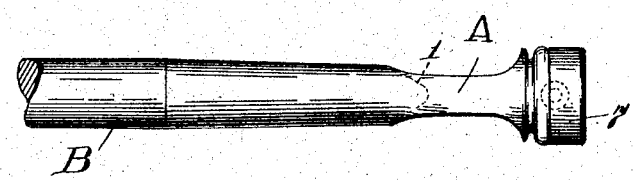
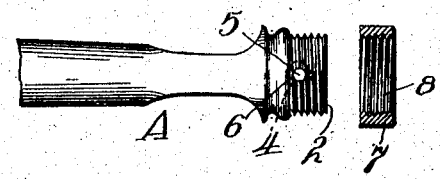 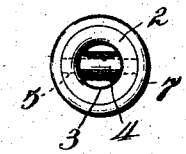
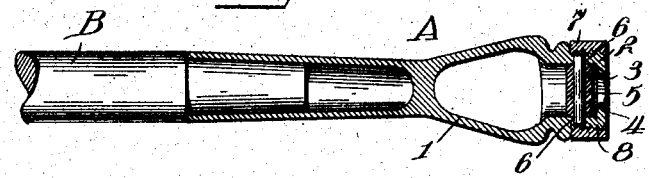
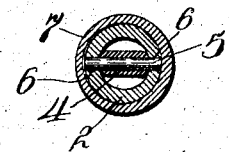
Witnesses
Milton C. Lenoir
Walter T. Estabrook
Inventors
Otto Miller and
Philip Kunzinger
by Clemont B. Hodge
their Attorney

UNITED STATES PATENT OFFICE.

OTTO MILLER AND PHILIP KUNZINGER, OF BROOKLYN, NEW YORK.

TIP FOR FISHING RODS OR POLES.

No. 796,342.        Specification of Letters Patent.        Patented Aug. 1, 1905.

Application filed March 22, 1905. Serial No. 251,466.

*To all whom it may concern:*

Be it known that we, OTTO MILLER and PHILIP KUNZINGER, citizens of the United States, residing at Brooklyn, in the county of Kings and State of New York, have invented certain new and useful Improvements in Tips for Fishing Rods or Poles, of which the following is a specification.

Our invention relates to an improvement in tips for fishing rods or poles; and the invention has for its object the provision of means for reducing the friction of the line to a minimum as it is reeled in and out.

With this object in view the invention consists in an antifriction-roller transversely mounted in a bore at the extreme outer end of the tip over which the line is drawn, whereby to facilitate its movement in and out and eliminate the element of friction as much as possible.

The invention further consists in certain novel features of construction and combinations of parts, which will be hereinafter described, and pointed out in the claims.

In the accompanying drawings, Figure 1 is a view in side elevation. Fig. 2 is an end view. Fig. 3 is a longitudinal section through the improved tip. Fig. 4 is a transverse section, and Fig. 5 is a view showing the ring or collar 7 separated from the threaded boss and in section.

A represents the tip, and B indicates the end of a pole or rod upon which the tip is mounted. The outer end of the tip has the transverse orifice 1 extending therethrough, and the tip terminates at the extreme outer end in a tubular boss 2. This tubular boss communicates with the transverse orifice 1. At its outer end the boss is preferably provided with an inturned annular flange 3. An antifriction-roller 4 is journaled transversely of the bore of this boss upon a pin 5, which pin preferably fits loosely in holes 6 6, drilled through the opposite walls or sides of the boss, and when thus loose the pin is held against accidental displacement by means of the internally-screw-threaded ring or collar 7, which is adapted to be removably screwed upon the external screw-threads 8 of the boss. This ring or collar when screwed in place extends over and incloses the ends of the pin, retaining it in position against accidental displacement, while at the same time completely covering the screw-threads 8 and imparting a neat finish to the end of the tip.

The inturned annular flange 3 forms an orifice of less diameter preferably than the length of the antifriction-roller bearing, so that the parts are assembled, preferably, by dropping the roller into place through the transverse orifice 1, whereupon the pin is inserted and the collar or ring is screwed in place. In this way a very simple attachment is provided for the rod or pole tip, and by reason of this construction, as illustrated in its most approved form, although not necessary form, it is perfectly easy for the owner to replace a worn pin or roller at any time without the necessity of removing the tip from the pole or rod, as would otherwise be required.

This invention may be easily applied, manufactured at a small initial cost, is light and attractive in appearance, and effectual in the performance of its functions.

Still another and more important function, perhaps, of the flange 5 is that it confines the line within bounds and precludes the possibility of its getting caught or wedged between the ends of the roller and the bore of the boss, and for that reason the inner edge of the flange is preferably rounded and made smooth. Of course the tip is so placed upon the pole or rod with relation to the reel that the line is held over the roller, and it is only incidentally and occasionally that the line comes in contact with the flange; but when it does the flange serves to keep it as near the center of the roller as possible.

It is evident that slight changes might be resorted to in the form and arrangement of the several parts described without departing from the spirit and scope of our invention, and hence we do not wish to limit ourselves to the exact construction herein set forth; but, Having fully described our invention, what we claim as new, and desire to secure by Letters Patent, is—

1. As an article of manufacture, a tip for fishing rods or poles having a tubular boss at its extreme outer end, and an antifriction-roller extending transversely of the bore of said boss.

2. As an article of manufacture, a tip for fishing rods or poles having a tubular boss at its extreme outer end, and an antifriction-roller exending transversely of the bore of said boss, the boss having an inturned annular flange at the outer end forming an orifice of less diameter than the length of the roller, whereby to prevent the line from wedging between the ends of the roller and the bore of the boss.

3. As an article of manufacture, a tip for fishing rods or poles having a tubular boss at the extreme outer end, and provided with a transverse orifice communicating with the bore of the tip, a flange at the outer end of the boss extending inwardly, an antifriction-roller of greater length than the diameter of the orifice formed by the flange, and a pin extending through the roller and into the boss upon which the roller turns.

4. As an article of manufacture, a tip for fishing rods or poles having a tubular boss at its outer end, an antifriction-roller extending across the bore of the boss, a pin removably inserted in the boss and through the roller, and a collar for retaining the pin removably in place.

5. As an article of manufacture, a tip for fishing rods or poles having a tubular boss which is externally screw-threaded and provided with oppositely-located holes, an antifriction-roller, a pin removably secured in said holes and having the roller mounted thereon, and an internally-screw-threaded ring or collar adapted to screw upon the threads of the boss over the ends of the pin whereby to retain the latter in place against accidental displacement.

In testimony whereof we affix our signatures in presence of two witnesses.

OTTO MILLER.
PHILIP KUNZINGER.

Witnesses:
M. S. McNamara,
Charles C. Suffren.